United States Patent
Inagawa et al.

(10) Patent No.: US 7,446,793 B2
(45) Date of Patent: Nov. 4, 2008

(54) IMAGE FORMING APPARATUS

(75) Inventors: Yuji Inagawa, Numazu (JP); Koji Tanimoto, Tagata-gun (JP); Kenichi Komiya, Kawasaki (JP); Daisuke Ishikawa, Mishima (JP); Hidehito Sasaki, Tokyo (JP); Hiroyuki Kunugi, Numazu (JP); Shungo Miyata, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 212 days.

(21) Appl. No.: 11/375,835

(22) Filed: Mar. 14, 2006

(65) Prior Publication Data

US 2007/0216750 A1    Sep. 20, 2007

(51) Int. Cl.
*B41J 2/435* (2006.01)
*G02B 26/08* (2006.01)

(52) U.S. Cl. .................. 347/236; 347/246; 359/216
(58) Field of Classification Search ................ None
See application file for complete search history.

(56) References Cited

U.S. PATENT DOCUMENTS

| 5,715,078 A * | 2/1998 | Shiraishi .................. 359/204 |
| 7,030,899 B2 * | 4/2006 | Hoshino et al. ............. 347/236 |
| 2005/0185236 A1 * | 8/2005 | Kudo ........................ 359/205 |

FOREIGN PATENT DOCUMENTS

| JP | 2001-88344 | 4/2001 |
| JP | 2002-292934 | 10/2002 |

OTHER PUBLICATIONS

Ishikawa, Daisuke, Pending U.S. Appl. No. 11/375,920, filed Mar. 14, 2006.
Idhikawa, Daisuke, Pending U.S. Appl. No. 11/376,777, filed Mar. 15, 2006.
Komiya, Kenichi, Pending U.S. Appl. No. 11/376,776, filed Mar. 15, 2006.
Komiya, Kenichi, Pending U.S. Appl. No. 11/376,791, filed Mar. 15, 2006.

* cited by examiner

*Primary Examiner*—Matthew Luu
*Assistant Examiner*—Kendrick X Liu
(74) *Attorney, Agent, or Firm*—Socal IP Law Group LLP; Steven C. Sereboff; John E. Gunther

(57) ABSTRACT

In the light amount correction in the main scanning direction, sets of correction values of black and cyan for which the reflection frequency of optical elements are equal to an even number of times are made common to each other (a correction value set—KC), and sets of correction values of magenta and yellow for which the reflection frequency of optical elements are equal to an odd number of times are made common to each other (a correction value set—MY), whereby sets of correction values stored in a correction value storage portion in a correction value setting portion are reduced to two sets. Furthermore, in connection with this, the number of DA converters is reduced to two DA converters of a DA converter—K, C and a DA converter—M, Y.

10 Claims, 14 Drawing Sheets

| Color | Reflection frequency | 0 | 1 | 2 | 3 | 4 | 5 | 6 | 7 | Reflection frequency |
|---|---|---|---|---|---|---|---|---|---|---|
| K | Optical element | LD-K | BS | Polygon mirror | M-Ka | M-Kb | M-Kc | Drum-K | | Five times (odd number of times) |
|   | Polarization | p | s | p | s | p | s | p | | |
| C | Optical element | LD-C | PP-Mb | Polygon mirror | M-Ca | M-Cb | M-Cc | Drum-C | | Five times (odd number of times) |
|   | Polarization | p | s | p | s | p | s | p | | |
| M | Optical element | LD-M | PP-Ma | BS | Polygon mirror | M-Ma | M-Mb | M-Mc | Drum-M | Six times (even number of times) |
|   | Polarization | p | s | p | s | p | s | p | s | |
| Y | Optical element | LD-Y | Polygon mirror | M-Ya | Drum-Y | | | | | Twice (even number of times) |
|   | Polarization | p | s | p | s | | | | | |

FIG. 9

IMAGE FORMING APPARATUS

BACKGROUND OF THE INVENTION

1. Field of the Invention

The present invention relates to a scanning and exposing device for exposing a photosensitive drum to a laser beam output from a semiconductor laser oscillator while scanning the photosensitive drum with the laser beam, and an image forming apparatus such as a digital copying machine or the like for forming an electrostatic latent image on the photosensitive drum by the exposure of the scanning and exposing device and coating developing agent on the electrostatic latent image to form an image.

2. Description of the Related Art

With respect to an image forming device such as a digital copying machine using a semiconductor laser (hereinafter referred to as laser) as a light source, there is generally adopted a construction that the light emission amount of a laser in an image area is detected by a built-in photodiode or a photodiode provided outside the laser, and the stabilizing control of the light emission amount (which is the control generally called as APC: Auto Power Control, hereinafter abbreviated as APC) is carried out by using output current from the photodiode.

The APC processing is the processing of setting the light amount of the laser on the laser light source to a predetermined value, however, some factor for varying the laser light amount exists on the optical path from the laser light source to the photosensitive drum in the actual image forming device. For example, the laser light amount is not uniform in the main scanning direction on the surface of the photosensitive drum due to the difference in transmittance of the optical element.

The transmittance of the optical element is varied in accordance with the incident light angle, and there is generally a characteristic that the transmittance is larger as the light is incident more vertically to the surface of the optical element and the transmittance is smaller as the light is more obliquely incident to the surface of the optical element. The incident angle of the laser beam in the main scanning direction to an f-θ lens used in an image forming device or the like is more vertical in the neighborhood of the center and more oblique as it approaches more closely to the end. Therefore, the transmittance of the optical element at the position in the main scanning direction on one line is larger at the upper side of the ordinate axis than that at the lower side of the ordinate axis. Accordingly, the difference in transmittance in the main scanning direction described above causes a problem that even when the laser light amount on the laser light source is made constant by APC, with respect to the laser light amount in the main scanning direction on the surface of the photosensitive drum, the laser light amount is larger at the center portion of the photosensitive drum where the transmittance of the optical element is larger and also the laser amount is smaller as it approaches more closely to the end of the photosensitive drum where the transmittance of the optical element is smaller.

Furthermore, the transmittance of the optical element has a characteristic varying in accordance with the difference in maker and type.

With respect to factors for varying the laser light amount in the laser optical path such as the difference in transmittance of the optical element as described above, etc., there has been considered a method in which a correction value for the laser light amount in connection with each position in the main scanning direction is set in a correction value storage portion such as a memory or the like in advance, and the laser light amount is varied in accordance with the position in the main scanning direction under scanning, so that the laser light amount on the photosensitive drum in the main scanning direction is fixed.

Still furthermore, a method of reducing the number of correction values for correction of light amount in the main scanning direction is described in JP-A-2000-292934.

However, the above-described method of reducing the number of correction values for correction of light amount is applied to the case where one light source is used. For example, in the case where four light sources are provided for black (K), cyan (c), magenta (M) and yellow (Y) (hereinafter, black, cyan, magenta and yellow are fitly represented by K, C, M and Y) in a quadruple tandem transfer color machine, it is required to provide light amount correction values in the main scanning direction for each of the four light sources and thus the number of set values of the correction amount is increased. When the number of set values for the correction amount is increased, there is a problem that the cost is increased.

BRIEF SUMMARY OF THE INVENTION

The object of an aspect of the present invention is to provide a scanning and exposing device and an image forming device that can reduce the number of correction values set in advance for correction of light amount in a main scanning direction when plural light sources are provided.

According to an aspect of the present invention, there is provided a scanning and exposing device for exposing a photosensitive drum to plural laser beams while scanning the photosensitive drum with the laser beams, the scanning and exposing device comprising: plural laser light sources for emitting laser beams; main scanning direction synchronizing means for outputting a synchronous signal of each scan in the main scanning direction; polarizing means for polarizing and sweeping the laser beams emitted from the plural laser light sources; plural optical elements for reflecting the laser beams polarized and swept by the polarizing means and guiding the laser beams onto respective photosensitive drums; light amount correcting means for correcting the light amounts of the laser beams emitted from the plural light sources in accordance with the synchronous signal from the main scanning direction synchronizing means; light amount correction value storage means for making common the correction values for correcting the light amounts of the laser beams to be corrected by the light amount correcting means, and storing correction values whose number is smaller than the number of the laser light sources.

According to another aspect of the present invention, there is provided an image forming device for exposing a photosensitive drum to plural laser beams while scanning the photosensitive drum with the laser beams, thereby forming an image, the image forming device comprising: plural laser light sources for emitting laser beams; main scanning direction synchronizing means for outputting a synchronous signal of each scan in the main scanning direction; polarizing means for polarizing and sweeping the laser beams emitted from the plural laser light sources; plural optical elements for reflecting the laser beams polarized and swept by the polarizing means and guiding the laser beams onto respective photosensitive drums; light amount correcting means for correcting the light amounts of the laser beams emitted from the plural laser light sources in accordance with the synchronous signal from the main scanning direction synchronizing means; light amount correction value storage means for making common the correction values for correcting the light amounts of the laser beams to be corrected by the light amount correcting means, and storing correction values whose number is smaller than the number of the laser light sources.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate preferred embodiments of the invention, and together with the general description given above and the detailed description of the embodiments given below, serve to explain the principles of an aspect of the invention.

FIG. 9 is a diagram showing the relationship of a reflection frequency by an optical element in the scanning and exposing portion;

DETAILED DESCRIPTION OF THE INVENTION

A mode according to the present invention will be described with reference to the accompanying drawings.

Figure 1:
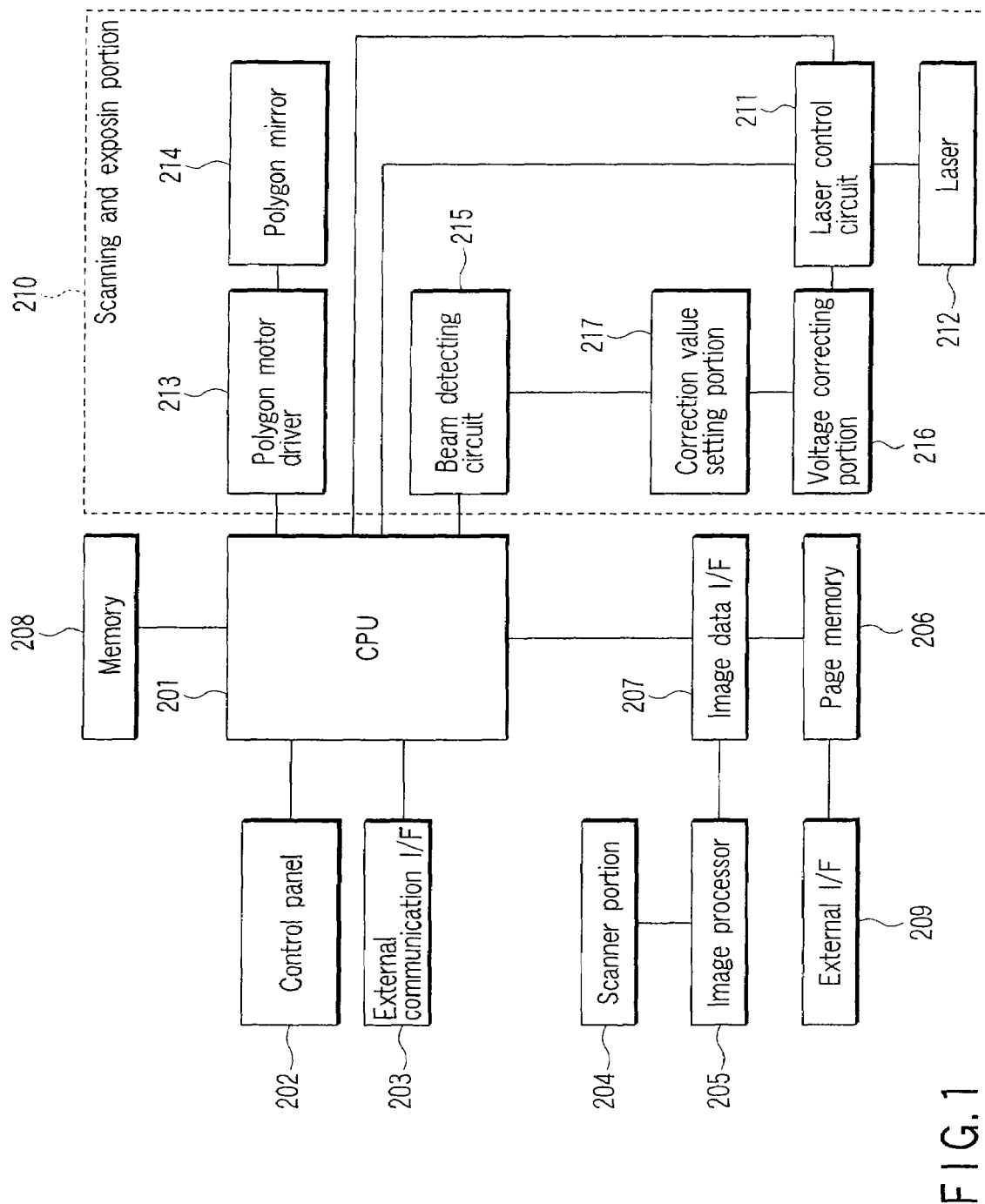
FIG. 1 is a block diagram showing the schematic construction of a digital composite machine according to an image forming device of the present invention.

FIG. 1 shows the schematic construction of a digital composite machine according to an image forming device of the present invention.

CPU 201 for controlling the whole of the digital composite machine reads out an image by a scanner portion 204 when the image is required to be read out in response to a print request from a user which is requested through a control panel 202 or an external communication interface (I/F) 203, subjects the read-out image data to image processing such as shading processing, etc. by an image processor 205 and stores the image-processed image data into a page memory 206 as occasion demands, for example, in the case of print of plural copies or the like. These processing is controlled through an image data interface (I/F) 207 by CPU 201. The data to be processed by CPU 201 are stored in the memory 208 as occasion demands. Data transferred from an external I/F 209 are also stored in the page memory 206.

The image data stored in the page memory 206 are transmitted to a laser control circuit 211 in a scanning and exposing portion 210 as a beam scanning device through the image data I/F 207 and CPU 201. The laser control circuit 211 controls ON/OFF operation of a laser 212 in accordance with the image data. The laser beam from the laser 212 is irradiated onto a photosensitive drum (not shown) line by line by a polygon mirror 214 which is driven by a polygon motor driver 213, and an electrostatic image is formed in accordance with the ON/OFF operation of the laser. Developing agent is coated on the latent image formed on the photosensitive drum (not shown), a sheet is transferred thereto by a transfer roller (not shown) and then heat and pressure are applied by a fixing unit (not shown) to form an image on the sheet.

In the scanning and exposing portion 210, the laser beam is detected by a beam detecting sensor described later, and the laser beam is converted to an electrical signal by a beam detecting circuit 215 to generate a horizontal synchronous signal serving as a reference for one scan in the main scanning direction.

Furthermore, a correcting voltage for correcting the light amount in the main scanning direction is applied to a laser control circuit 211 by a voltage correcting portion 216. The value of the correcting voltage is preset in a correction value setting portion 217.

Figure 2:
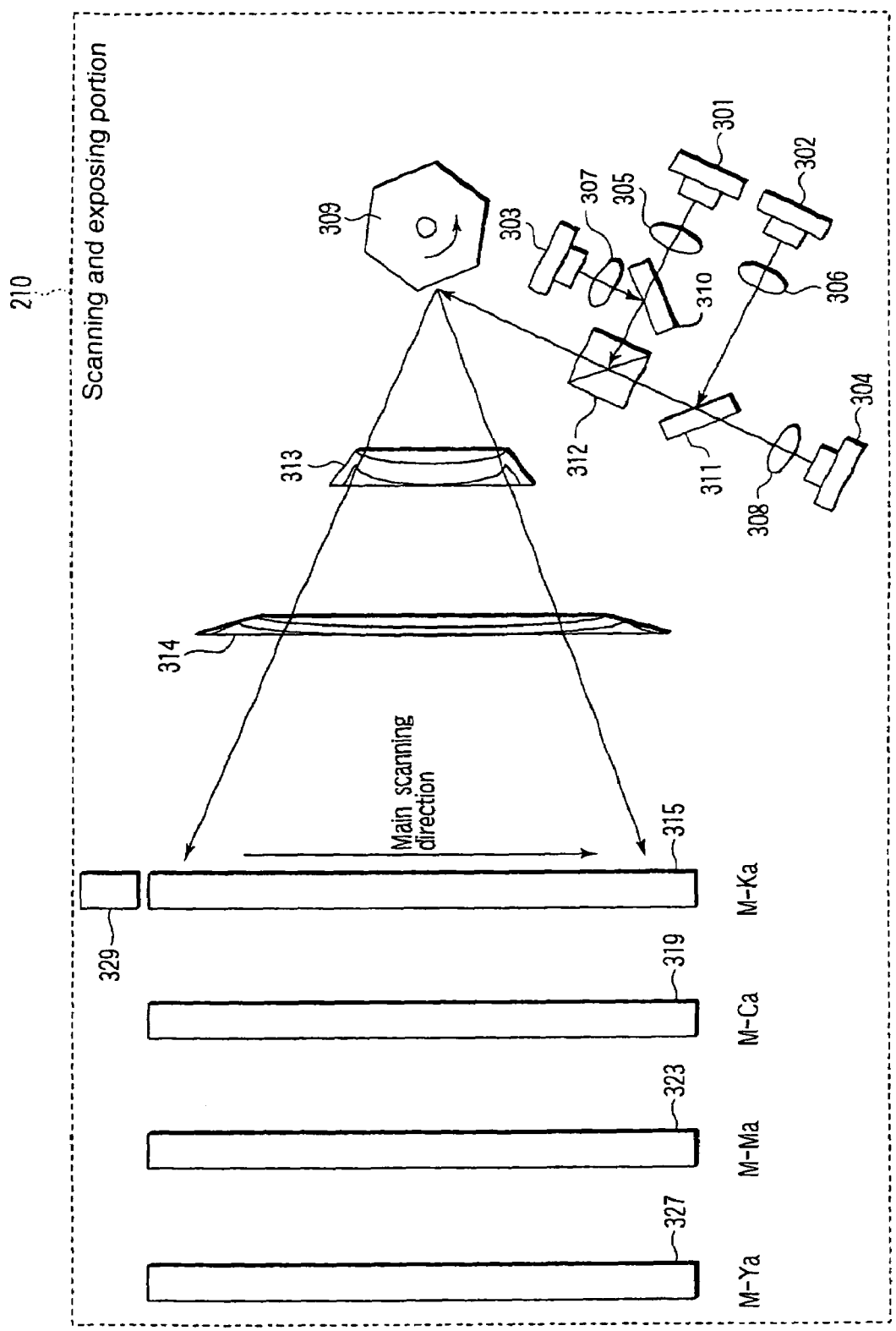
FIG. 2 is a top view showing a scanning and exposing portion of the present invention.
Figure 3:
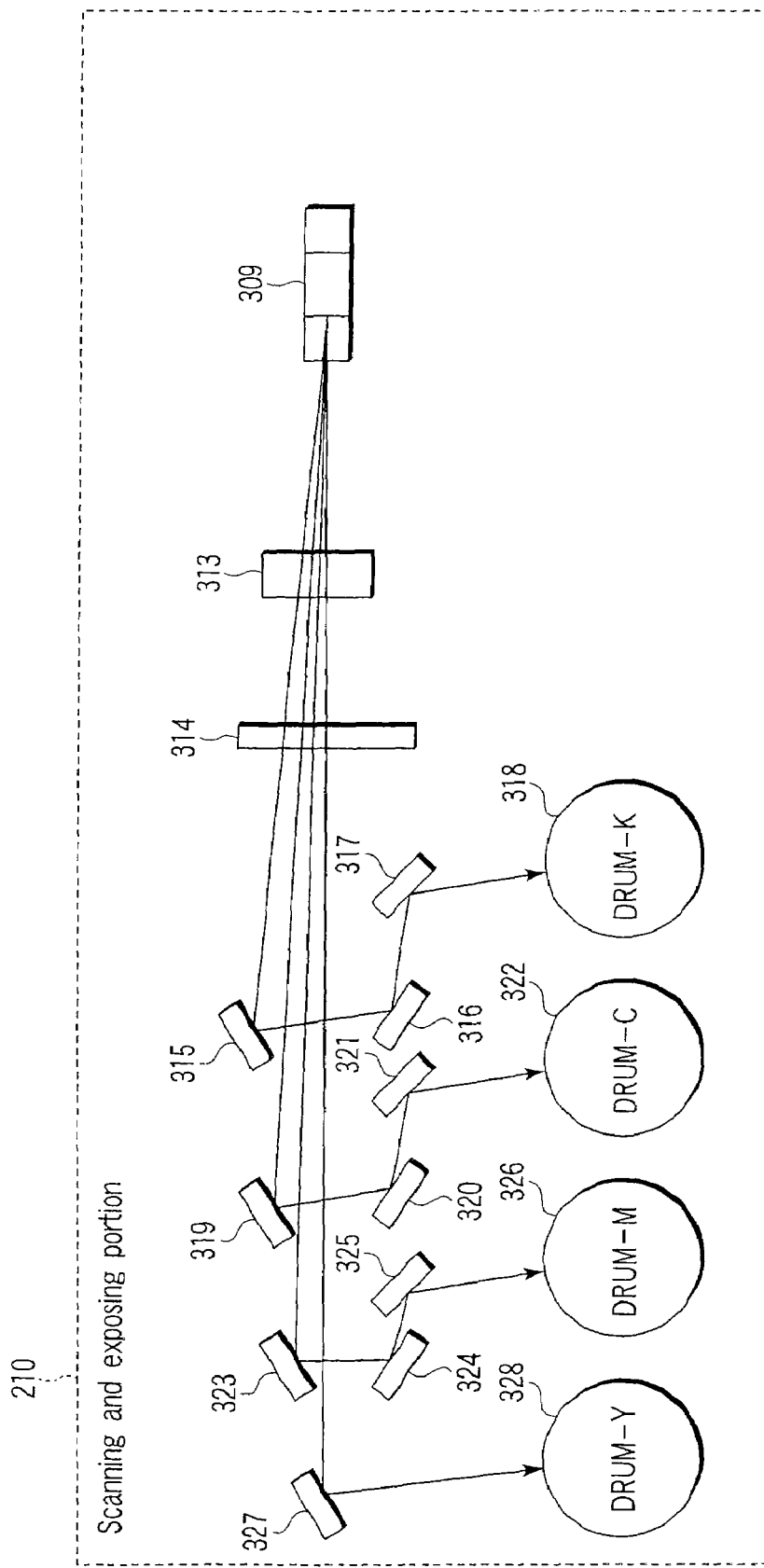
FIG. 3 is a side view showing the scanning and exposing portion of the present invention.

FIGS. 2 and 3 show the schematic construction of the scanning and exposing portion 210, wherein FIG. 2 is a top view and FIG. 3 is a side view.

In FIG. 2, respective laser beams emitted from a laser K 301, a laser C 302, a laser M 303 and a laser Y 304 serving as light sources for developing the respective colors of black (K), cyan (C), magenta (M) and yellow (Y) are collimated by collimator lenses L-K 305, L-C 306, L-M 307 and L-Y 308, respectively.

The laser beam is elliptical, and thus it may be improved in aspect ratio by a cylindrical lens (not shown).

Each collimated laser beam is reflected by a polygon mirror 309, and the laser beams of cyan and magenta out of the collimated laser beams are reflected by PP-Ma 310 and PP-Mb 311 serving as pre-polygon mirrors (PP-M), and the laser beams of black and magenta are reflected by a beam splitter (BS) 312 and then reflected by the polygon mirror 309.

The laser beams of black (K), cyan (C), magenta (M) and yellow (Y) which are rotated/reflected by the polygon mirror 309 are passed through an f/θ lens a 313 and an f/θ lens b 314 while swept, and reflected by respective mirrors prepared for the respective colors, whereby the photosensitive drums for the respective colors are exposed to and scanned with the respective laser beams.

In FIG. 3, the laser beam of black is reflected from M-Ka 315, M-Kb 316 and M-Kc 317 and the photosensitive drum K 318 is exposed to and scanned with the laser beam of black, the laser beam of cyan is reflected from M-Ca 319, M-Cb 320 and M-Cc 321 and the photosensitive drum C 322 is exposed to and scanned with the laser beam of cyan, the laser beam of magenta is reflected from M-Ma 323, M-Mb 324 and M-Mc 325 and the photosensitive drum M 326 is exposed to and scanned with the laser beam of magenta, and the laser beam of yellow is reflected from M-Ya 327 and the photosensitive drum Y 328 is exposed to and scanned with the laser beam of yellow.

Furthermore, the laser beam of black is detected by the beam detecting sensor 329 shown in FIG. 2, and converted to a beam detection signal by the beam detecting circuit 215 to generate a horizontal synchronous signal serving as a reference for each scan in the main scanning direction. The remaining horizontal synchronous signals for cyan, magenta and yellow are made common to the horizontal synchronous signal of black thus generated. Alternatively, they may be set to be displaced from the horizontal synchronous signal of black by predetermined intervals.

Figure 4:
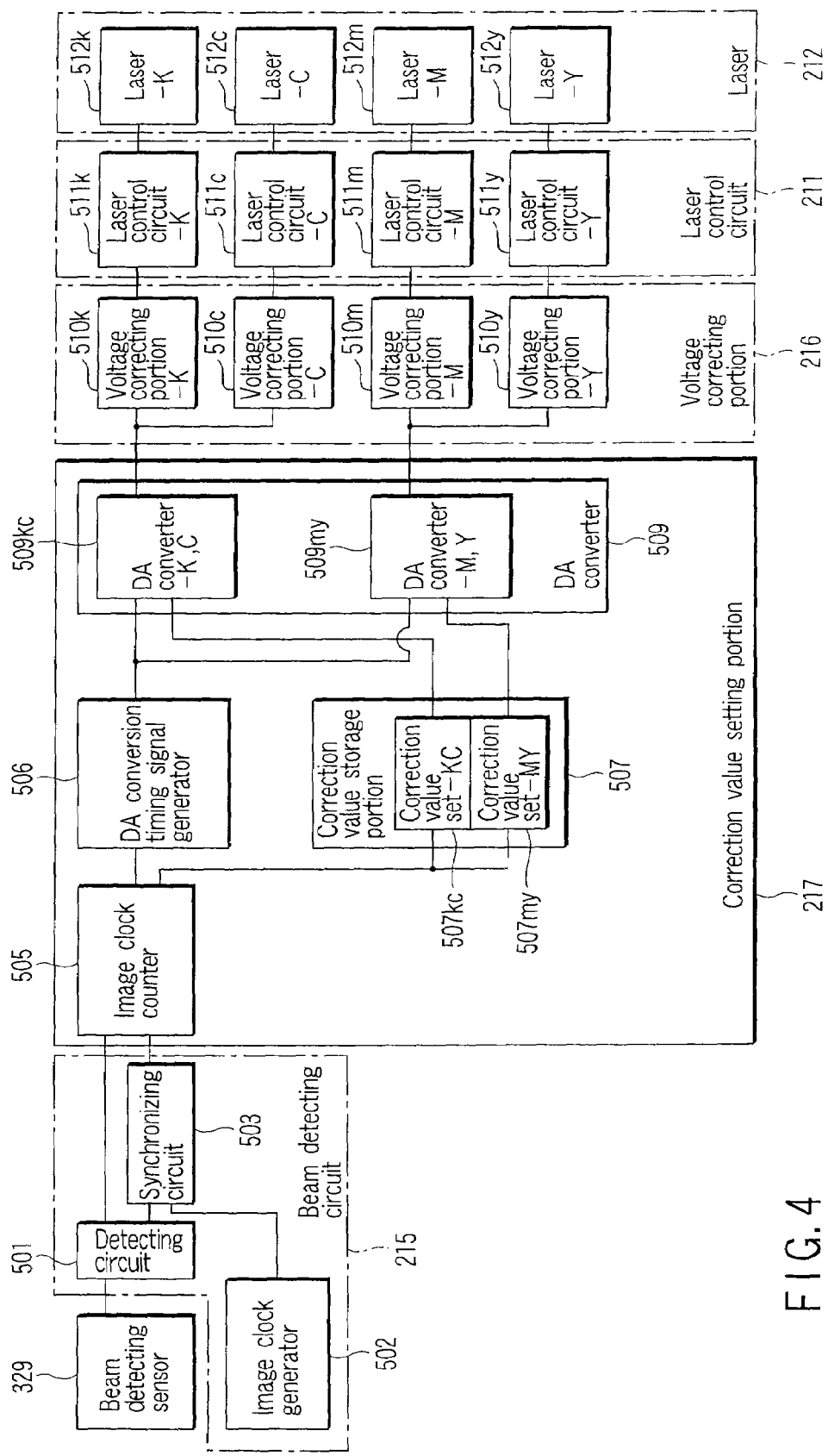
FIG. 4 is a diagram showing a construction of correcting the light amount in a main scanning direction according to the present invention.

FIG. 4 shows a construction of correcting the light amount in the main scanning direction according to the present invention.

The beam detecting circuit 215 comprises a detecting circuit 501, an image clock generator 502 and a synchronizing circuit 503.

The swept laser beam is detected by the beam detecting sensor 329, the horizontal synchronous signal (HSYNC signal) serving as a reference for each scan in the main scanning direction is generated by the detecting circuit 501, and an image clock signal serving as a reference for an image data signal is generated by the image clock generator 502. The synchronizing circuit 503 synchronizes the image clock signal with the horizontal synchronous signal (HSYNC signal), and outputs the image clock signal synchronized with the horizontal synchronous signal (HSYNC signal) to a correction value setting portion 217.

The correction value setting portion 217 comprises an image clock counter 505, a digital/analog (hereinafter abbreviated to DA) conversion timing signal generator 506, a correction value storage portion 507 and a DA converter 509. The correction value storage portion 507 stores therein a correction value pair—KC 507kc as the correction values of black and cyan over one scan for the correction of the light amount in the main scanning direction, and a correction value pair—MY 507my as the correction values of magenta and yellow over one scan. Furthermore, the DA converter 509 has therein a DA converter—KC 509kc for conducting DA conversion of black and cyan and a DA converter—MY 509my for conducting DA conversion of magenta and yellow.

The number of clocks of the image clock signal synchronous with the horizontal synchronous signal (HSYNC signal) input from the synchronizing circuit 503 is counted by an image clock counter 505, and the correction value of the address corresponding to the image clock counter value out of the correction values stored in the correction value storage portion 507 is read out from the correction value storage portion 507. On the basis of the image clock counter value, it is determined which correction value should be used to carry out the correction at which position in the main scanning direction. The correction values stored in the correction value storage portion 507 are digital values, and thus they are converted to analog voltage amounts. With respect to the DA conversion timing of the DA converter 509, the conversion timing is determined on the basis of a DA conversion timing signal (DA conversion signal) generated from the DA conversion timing signal generator 506 in accordance with the counter value of the image clock counter 505. The counter value of the image clock counter 505 is reset on the basis of the horizontal synchronous signal (HSYNC Signal).

The laser 212 comprises a laser-K 512k, a laser-C 512c, a laser-M 512m, and a laser-Y 512y as a light source to develop each of the colors of black (K), cyan (C), magenta (M), and yellow (Y). The laser control circuit 211 comprises a laser control circuit-K 511k, a laser control circuit-C 511c, a laser control circuit-M 511m, and a laser control circuit-Y 511y to control the laser of each of the colors of black (K), cyan (C), magenta (M), and yellow (Y). The voltage correcting portion 216 comprises a voltage correcting portion-K 510k, a voltage correcting portion-C 510c, a voltage correcting portion-M 510m, and a voltage correcting portion-Y 510y to generate correcting voltages respectively for each of the colors of black (K), cyan (C), magenta (M), and yellow (Y).

The following processing will be described for black.

The analog voltage value output from the DA converter 509 is connected to a hold capacitor described later for adjusting the laser light amount of a laser—K 512k controlled by a laser control circuit—K 511k through a voltage correcting portion—K 510k, and corrects the laser beam amount of the laser—K 512k.

Figure 5:
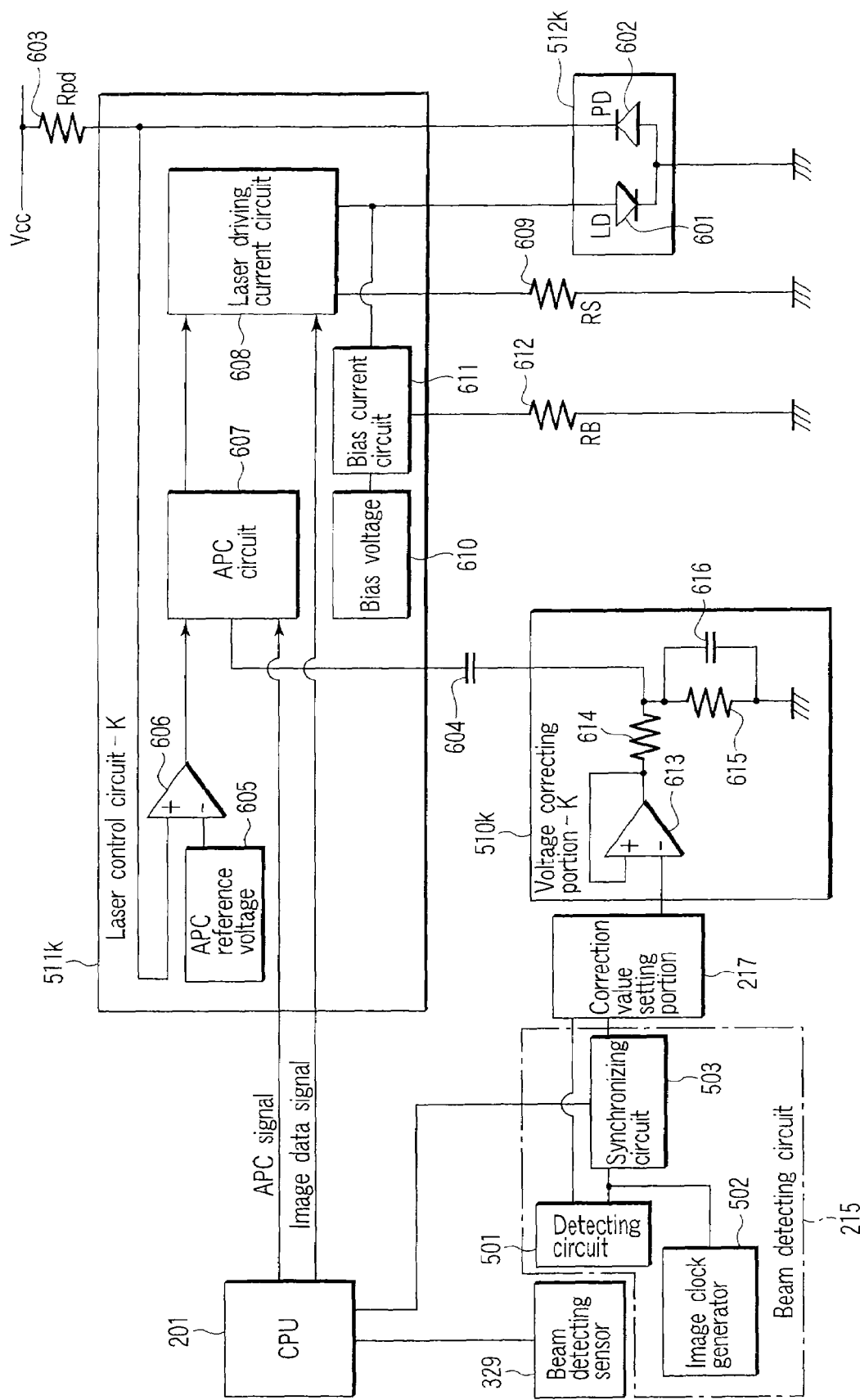
FIG. 5 is a diagram showing the construction of a laser control circuit and a voltage correcting portion.

FIG. 5 shows the voltage correcting portion—K 510k, the laser control circuit—K 511k and the laser K 512k, and the details thereof will be described.

First, laser light amount stabilizing control (APC) controlled by the laser control circuit—K 511k will be described.

APC is defined as follows. The laser beam amount of a laser light source (LD) 601 of the laser—K 512k is detected by a built-in photodiode (PD) 602 or PD provided outside the laser, and a laser beam having a desired light amount is emitted in accordance with detected current of the PD 602.

Specifically, first, predetermined current is made to flow through the laser—K 512k, and the light emission amount of LD 601 corresponding to the current concerned is detected as current in PD 602. The detected current is converted to a voltage by an adjusting resistor Rpd 603, and the voltage value after the conversion (detected voltage Vm) is compared with the voltage value corresponding to a desired light emission amount (reference voltage Vref). If the detected voltage Vm is larger than a reference voltage Vref, the hold capacitor 604 is discharged, and if the detected voltage Vm is smaller than the reference voltage Vref, the hold capacitor 604 is charged, whereby the charge of the hold capacitor 604 is adjusted so that the detected voltage Vm is equal to the reference voltage Vref, thereby keeping the laser light amount of LD 601 constant. Here, the reference voltage Vref is supplied from an APC reference voltage 605, however, it may be supplied from the external. Furthermore, the comparison between the reference voltage Vref and the detected voltage Vm is carried out by a comparator 606.

The above-described APC processing is executed when an APC circuit 607 is active. When the APC circuit 607 is inactive, the comparator 606 is separated, and LD 601 is turned on with the voltage corresponding to the charge of the hold capacitor 604.

The active/inactive states of the APC circuit 607 are switched to each other on the basis of an APC signal input from CPU 201. With respect to the timing of active/inactive states, the number of image clocks generated from the synchronizing circuit 503 is counted on the basis of the horizontal synchronous signal (HSYNC signal) generated from the beam detecting sensor 329 by CPU 201, and the timing of active/inactive is switched on the basis of the count number. Normally, the APC circuit 607 is set to the active state at a part of the area out of the image area, and the APC circuit 607 is set to the inactive state within the image area.

The laser light amount stabilizing control (APC) has been described above. In the laser control circuit—K 511k, the light amount of LD 601 is kept fixed by APC, and LD 601 is turned on/turned off in accordance with the image data signal transmitted from CPU 201 by a laser driving current circuit 608. A laser driving current limiter resistor RS 609 is connected to the laser driving current circuit 608, the maximum laser driving current can be set by this resistance value, and the laser driving current is controlled so that it is not larger than a default value. In order to improve the response characteristic of turn-on/turn-out of LD 601, bias current may be added by a bias voltage 610 and a bias current circuit 611. At this time, the bias current can be adjusted by a bias current setting resistor RB 612. Furthermore, offset current from a threshold value of LD 601 may be set in place of the bias current.

The laser control circuit—K 511k has been described above. The laser light amount in the image area is determined by the charge of the hold capacitor 604. A voltage correcting portion—K 510k is connected to the hold capacitor 604, and the correcting voltage is added to the charge of the hold capacitor 604 to adjust the light amount of LD 601. The voltage correcting portion—K 510k holds the correcting voltage input from the correction value setting portion 217 by a voltage follower 613. Since the correcting voltage is in several volts order, it is adjusted to several tens mV order by dividing the correcting voltage by the resistor 614, 615 and added to the hold capacitor 604. By adding a capacitor 616 in parallel to a resistor 615, noise is made to hardly occur at the voltage correction time.

Figure 6:
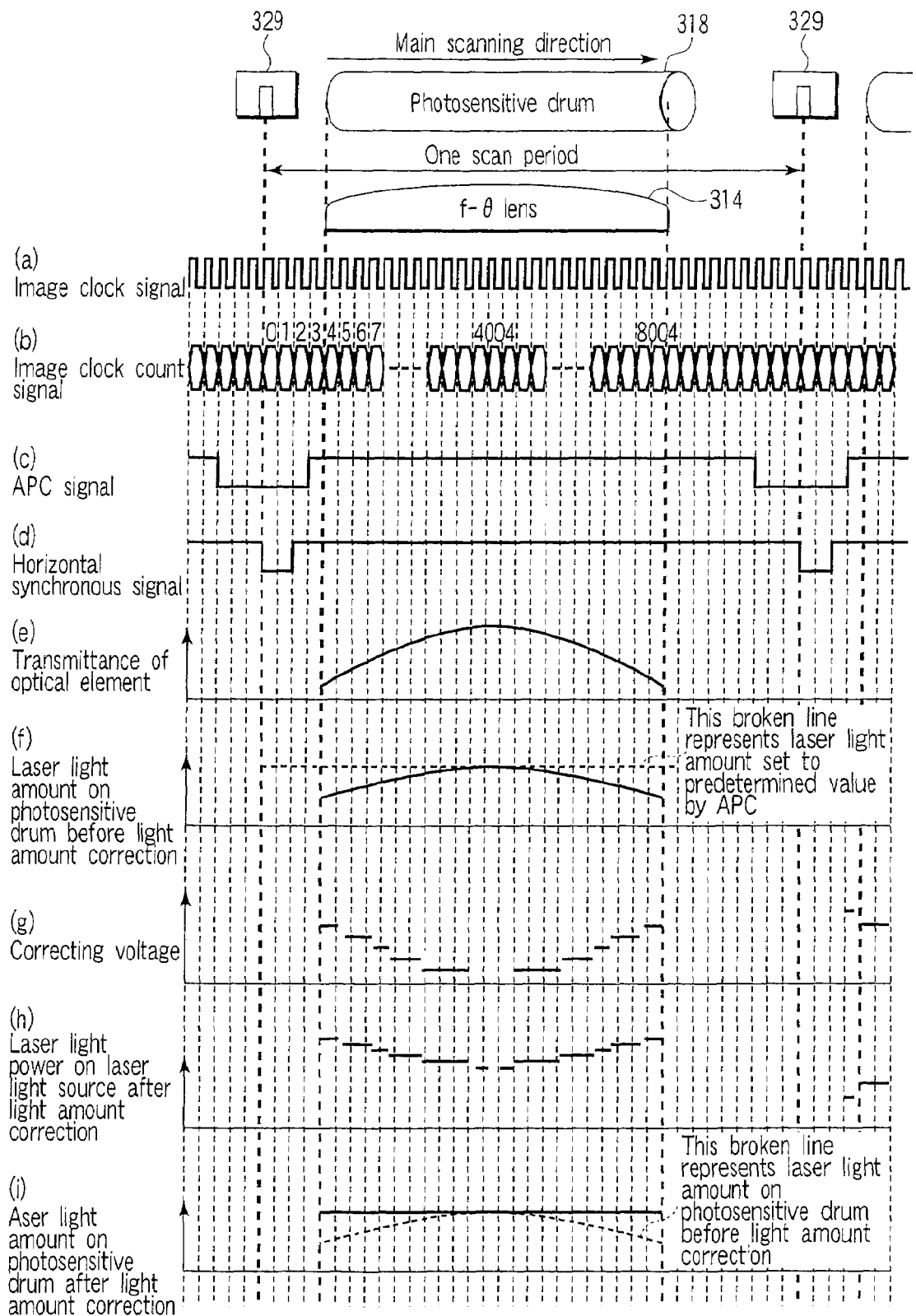
FIG. 6 is a timing chart for correcting the light amount in one scan.

FIG. 6 shows the correcting operation of the light amount during one scan. That is, it shows the timing of a series of processing of correcting the light amount during one scan described with reference to FIGS. 4 and 5.

In FIG. 6, the abscissa axis represents the position in the laser main scanning direction, and the ordinate axis represents:

(a) image clock signal;
(b) image clock count value;
(c) APC signal timing;
(d) horizontal synchronous signal timing;
(e) transmittance of optical element (f-θ lens);
(f) laser light amount on photosensitive drum before light amount is corrected;
(g) correcting voltage added by voltage correcting portion;
(h) laser light amount on laser light source after light amount is corrected; and
(i) laser light amount on photosensitive drum after light amount is corrected.

First, in the middle of ON of the APC signal shown in (c) of FIG. 6, the laser beam turned on by the laser light amount stabilizing control (APC) is input to a beam detecting sensor 329 to generate a horizontal synchronous signal shown in (d) of FIG. 6.

The image clock signal shown in (a) of FIG. 6 is synchronized with the horizontal synchronous signal shown in (d) of FIG. 6 every scan by the synchronizing circuit 503. In (a), (d) of FIG. 6, the synchronization is carried out at the falling of the horizontal synchronous signal shown in (d) of FIG. 6, for example.

In (a) to (i) of FIG. 6, the position in the main scanning direction, that is, the position on the photosensitive drum 318 in the main scanning direction is determined on the basis of the clock counter number of the image clock signal with the horizontal synchronous signal as a reference.

In an image area to be scanned on the photosensitive drum 318, the transmittance of the optical element is larger at the center portion of the optical element and smaller as the position approaches to the end of the optical element as shown in (e) of FIG. 6. The laser light amount on the photosensitive drum 318 is more attenuated as the position is shifted to the end as shown in (f) of FIG. 6 as compared with the laser light amount which is set to a predetermined value by the laser light amount stabilizing control (APC) indicated by a broken line.

In accordance with the reduction of the laser light amount with respect to the position in the main scanning direction, the correcting voltage shown in (g) of FIG. 6 is added every clock counter number corresponding to the position in the main scanning direction by the voltage correcting portion—K 510k, thereby correcting the laser light amount on the laser light source ((h) of FIG. 6).

The correcting voltage is set so as to be smaller at the center portion where the laser light amount shown in (f) of FIG. 6 varies little and larger at the end portion where the laser light amount is smaller.

As described above, by adding the correcting voltage in accordance with the position in the main scanning direction, the laser light amount on the photosensitive drum 318 is kept fixed ((i) of FIG. 6).

Furthermore, with respect to the timing of varying the correcting voltage shown in (g) of FIG. 6, the correcting voltage is not required to be varied every clock of the image clock signal, and it may be varied every several clocks.

Next, the relationship between the polarization of the laser beam and the reflectivity of the optical element will be described.

When considering reflection of a laser beam by a mirror or the like, it may be considered by dividing the reflection of the laser beam into reflection of electric field parallel to the incident face (p-polarization light) and electric field vertical to the incident face (s-polarization light), and reflectivity is different between the p-polarization light and the s-polarization light. Furthermore, the tendency of the reflectivity with respect to the incident angle to the reflection face is different between the p-polarization light and the s-polarization light.

Figure 7:
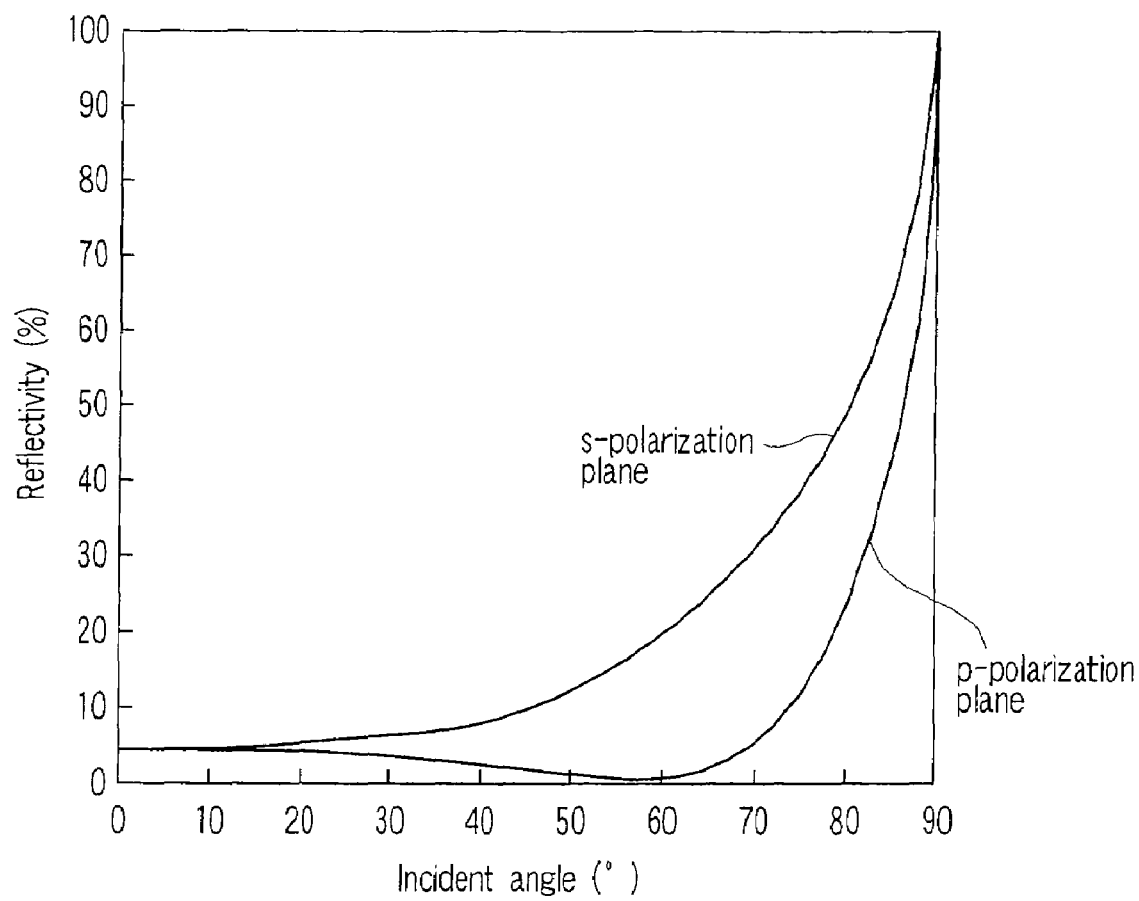
FIG. 7 is a diagram showing an example of the characteristics of polarization and reflectivity of laser beam.

FIG. 7 shows an example of the characteristics of the polarization of the laser beam and the reflectivity. FIG. 7 separately shows the relationship between the incident angle and the reflectivity for glass (refractive index n=1.52) for each of the p-polarization light and the s-polarization light.

Furthermore, there is a characteristic that the p-polarization light and the s-polarization light are switched to each other when reflected. Therefore, when the frequency of reflection from optical elements such as a mirror, etc. is varied in the optical path from the light source to the image surface, the light amount on the image surface in the main scanning direction is not constant.

Figure 8:
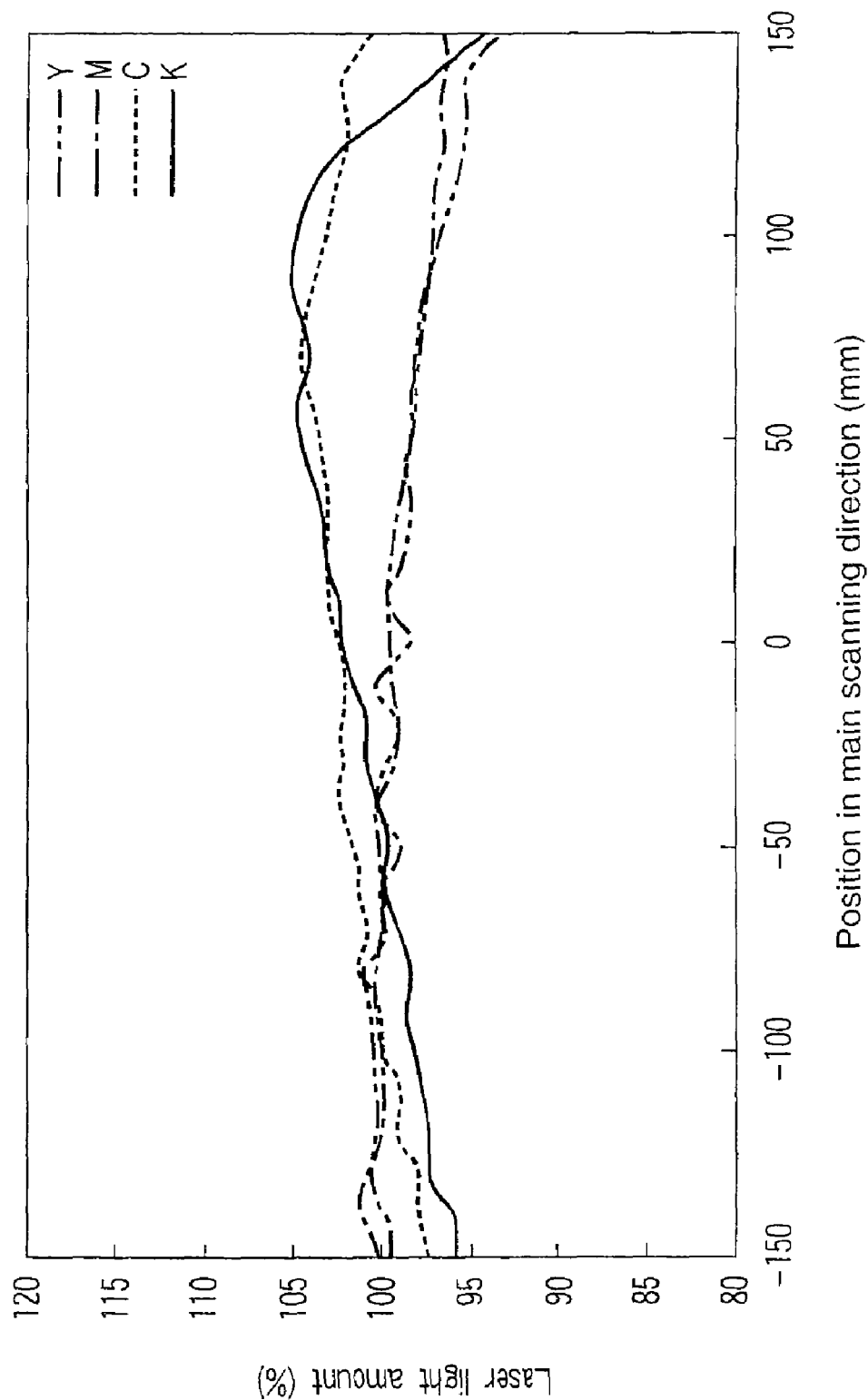
FIG. 8 is a diagram showing an example of a laser light amount on a photosensitive drum.

FIG. 8 shows an example of the actually measured value of the difference between the dispersion of the light amount in the main scanning direction on the image surface when the reflection frequency in the optical path extending from the light source to the image surface is equal to an odd number of times and the dispersion of the light amount in the main scanning direction on the image surface when the reflection frequency in the optical path extending from the light source to the image surface is equal to an even number of times.

As shown in FIG. 8, it is found that black (solid line) and cyan (broken line) for which the reflection frequency in the optical path from the light source to the image surface is equal to an odd number of times have similar tendencies in light amount dispersion, and magenta (one-dotted chain line) and yellow (two-dotted chain line) for which the reflection frequency in the optical path from the light source to the image surface is equal to an even number of times have similar tendencies in light amount dispersion.

FIG. 9 shows the relationship between the polarization of the laser beam and the reflection frequency of the optical element in the scanning and exposing portion 210 of this embodiment. FIG. 9 shows the replacement of polarization when the laser light source of each color is reflected by the optical element. Here, it is assumed that the reflection frequency is equal to zero for the laser—K (LD-K) 301, the laser—C (LD-C) 302, the laser—M (LD-M) 303 and the laser—Y (LD-Y) 304, and the exposure of the photosensitive drums (318, 322, 326, 328) to light is illustrated as being hatched and it is not counted as the reflection frequency.

As is apparent from FIGS. 8 and 9, the tendency of the dispersion of the laser light amount in the main scanning direction on the photosensitive drum is varied in accordance with which one of the even number of times and the odd number of times the reflection frequency is equal to. The tendency of the dispersion of the laser light amount in the main scanning direction is observed as being similar between laser beams if both the reflection frequencies of the laser beams concerned are likewise even numbers of times or odd numbers of times.

Figure 10:
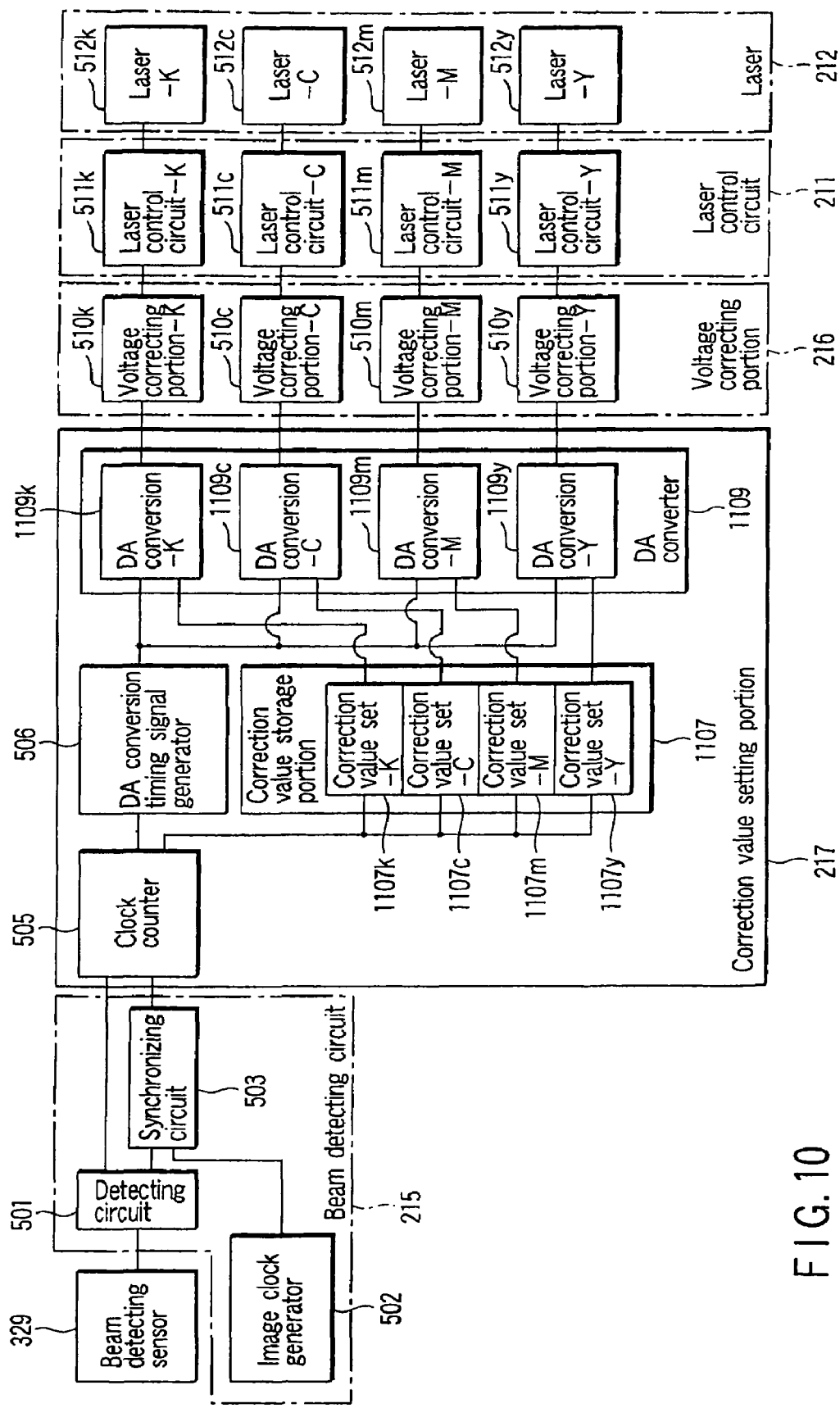
FIG. 10 is a diagram showing a conventional construction of correcting the light amount in the main scanning direction.

FIG. 10 shows a conventional construction of correcting the light amount in the main scanning direction. The same parts as FIG. 4 showing the construction of correcting the light amount in the main scanning direction of the present invention are represented by the same reference numerals, and the description is omitted. The difference between the conventional construction shown in FIG. 10 and the construction of the present invention shown in FIG. 4 resides in the correction value setting portion 217.

That is, in the conventional construction of correcting the light amount in the main scanning direction shown in FIG. 10, a set of correcting values stored in a correction value storage portion 1107 in the correction value setting portion 217 are set every light source. Therefore, there are required four sets of correction values which are a correction value set—K 1107k, a correction value set—C 1107c, a correction value set—M 1107m and a correction value set—Y 1107y.

On the other hand, the number of the sets of correction values of the present invention shown in FIG. 4 is reduced to two sets by making common the correction value sets of black and cyan for which the reflection frequency of the optical elements is equal to even number of times (correction value set—KC 507kc) and making common the correction value sets of magenta and yellow for which the reflection frequency of the optical elements is equal to odd number of times (correction value set—MY 507my).

Furthermore, the conventional DA converter 1109 shown in FIG. 10 is equipped therein with a DA converter—K 1109k, a DA converter—C 1109c, a DA converter—M 1109m and a DA converter—Y 1109y, and these converters carry out DA conversion for black, cyan, magenta and yellow, respectively.

On the other hand, the DA converter 509 of the present invention shown in FIG. 4 is equipped therein with a DA converter—K, C 509kc and a DA converter—M, Y 509my, and the number of the DA converters is reduced to two.

Next, a second embodiment will be described.

Figure 11:
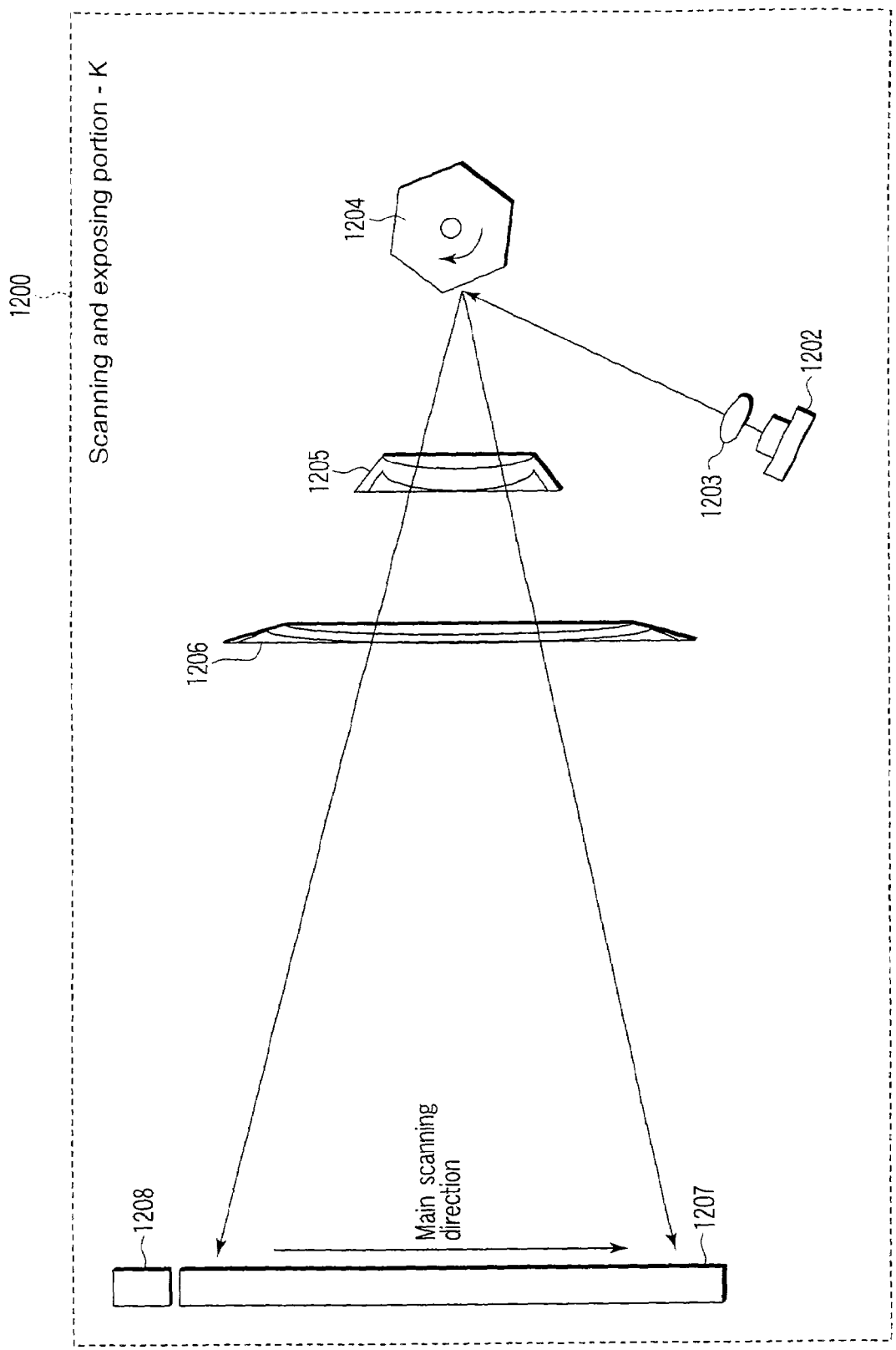
FIG. 11 is a top view of a scanning and exposing portion—K according to a second embodiment.
Figure 12:
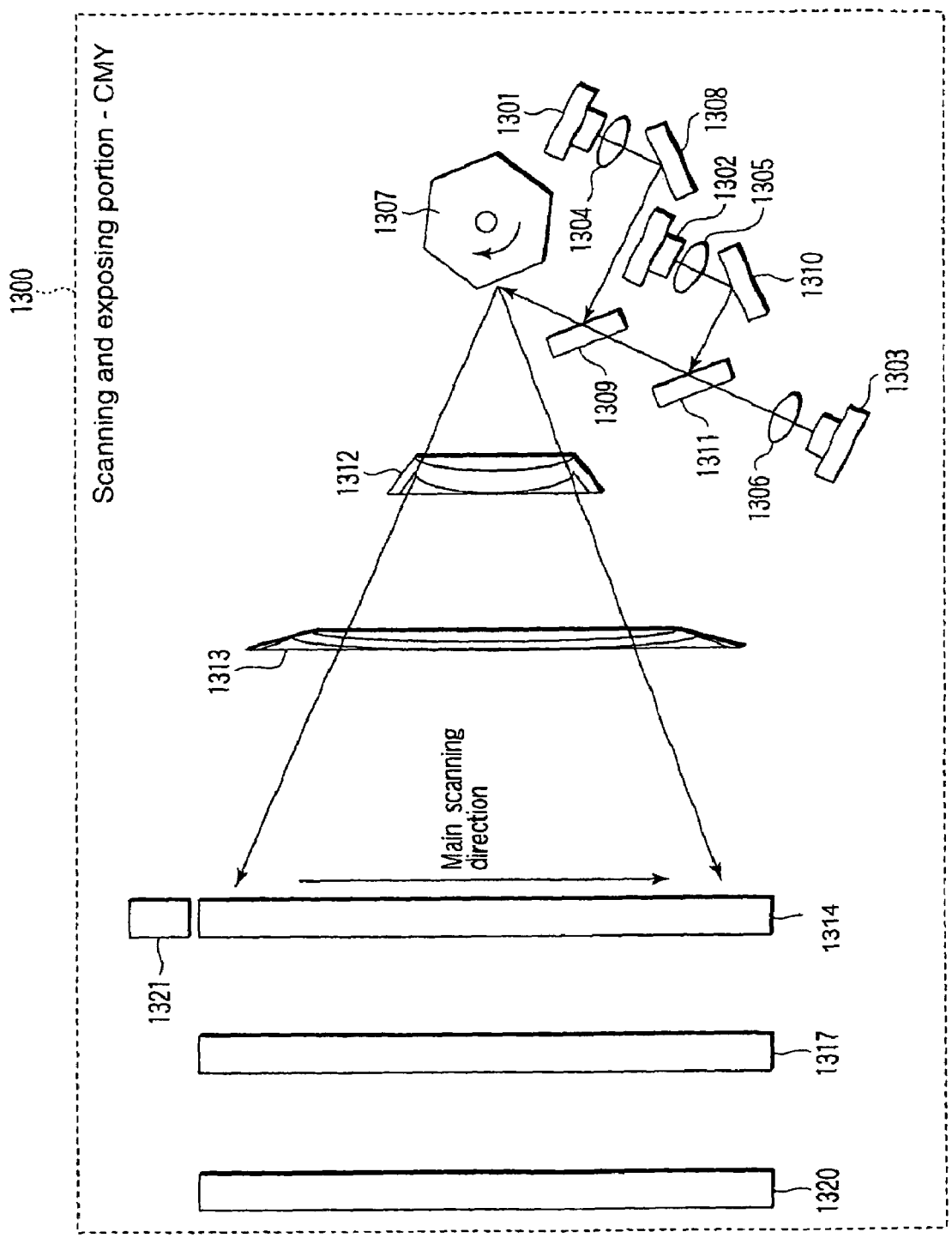
FIG. 12 is a top view of a scanning and exposing portion—CMY according to the second embodiment.
Figure 13:
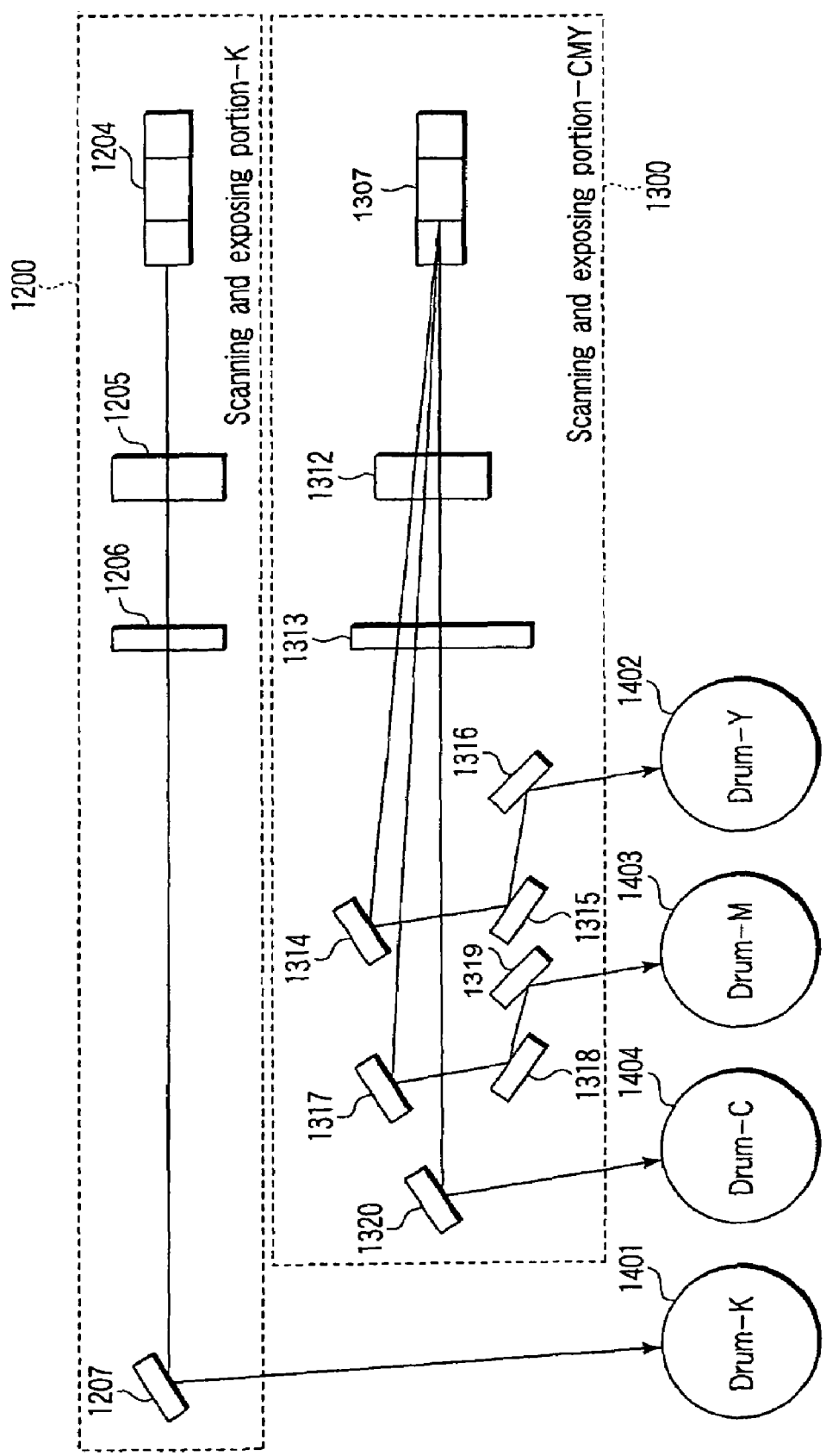
FIG. 13 is a side view showing a scanning and exposing portion according to the second embodiment.

FIGS. 11, 12, 13 show the construction of a scanning and exposing portion according to a second embodiment of the present invention. In the second embodiment of the present invention, the scanning and exposing portion is divided into two scanning and exposing portions, one for black and the other for cyan, magenta and yellow. Further, the same parts as the first embodiment are represented by the same reference numerals, and the description is omitted.

FIG. 11 is a top view of a scanning and exposing portion—K 1200 for black, FIG. 12 is a top view of a scanning and exposing portion—CMY 1300 for cyan, magenta and yellow, and FIG. 13 is a side view of the scanning and exposing portion—K 1200 for black and a side view of the scanning and exposing portion—CMY 1300 for cyan, magenta and yellow.

First, the scanning and exposing portion—K 1200 for black will be described with the top view of FIG. 11 and the side view of FIG. 13.

A laser beam emitted from the laser K 1202 serving as a light source for developing black is collimated by a collimator lens L-K 1203. Since the laser beam is elliptical, the aspect ratio may be improved by a cylindrical lens (not shown).

The collimated laser beam is reflected by a polygon mirror 1204.

The laser beam of black which is rotated/reflected by the polygon mirror 1204 is transmitted through an f/θ lens a 1205 and an f/θ lens b 1206, and then reflected by a return mirror M-Ka 1207. In the side view of the scanning and exposing portion—K 1200 of FIG. 13, the laser beam of black is reflected by the return mirror M-Ka 1207 and then irradiated to the photosensitive drum—K 1401 while scanning the photosensitive drum—K 1401 with the laser beam of black.

Furthermore, the laser beam of black is detected by a beam detecting sensor K 1208 shown in FIG. 11 and converted to a beam detection signal by a detecting circuit described later to generate a horizontal synchronous signal serving as a reference for one scan in the main scanning direction.

Next, the scanning and exposing portion—CMY 1300 for cyan, magenta and yellow will be described.

Respective laser beams emitted from a laser C 1301, a laser M 1302 and a laser Y 1303 serving as light sources for developing the respective colors of cyan, magenta and yellow are collimated by collimator lenses L-C 1304, L-M 1305 and L-Y 1306, respectively. The laser beams are elliptical, and thus the aspect ratio thereof may be improved by a cylindrical lens (not shown).

Each collimated laser beam is reflected by the polygon mirror 1307. In this case, the cyan laser beam out of the collimated laser beams is reflected by PP-Ma 1308, PP-Mb 1309 as pre-polygon mirrors (PP-M), and the magenta laser beam is reflected by PP-Mc 1310 and PP-Md 1311. Thereafter, these laser beams are reflected by the polygon mirror 1307. The respective laser beams of cyan, magenta and yellow which are rotated/reflected by the polygon mirror 1307 are transmitted through the f/θ lens a 1312, the f/θ lens b 1313 and then reflected by a mirror prepared every color so that the respective photosensitive drums of respective colors are exposed to and scanned with the laser beams.

In FIG. 13, the laser beam of yellow is reflected by M-Ya 1314, M-Yb 1315 and M-Yc 1316, and irradiated onto the photosensitive drum—Y 1402 while scanning the photosensitive drum—Y 1402 with the laser beam concerned. The laser beam of magenta is reflected by M-Ma 1317, M-Mb 1318 and M-Mc 1319, and irradiated onto the photosensitive drum—M 1403 while scanning the photosensitive drum—M 1403 with the laser beam concerned. The laser beam of cyan is reflected by M-Ca 1320, and irradiated onto the photosensitive drum—C 1404 while scanning the photosensitive drum—C 1404 with the laser beam concerned.

Furthermore, the laser beam of yellow is detected by a beam detecting sensor CMY 1321 shown in FIG. 12 and converted to a beam detection signal by a detecting circuit described later, to generate a horizontal synchronous signal as a reference for one scan in the main scanning direction. The remaining horizontal synchronous signals of cyan and magenta are common to the synchronous signal of yellow. Alternatively, these horizontal synchronous signals may be displaced from the synchronous signal of yellow by only predetermined intervals.

Figure 14:
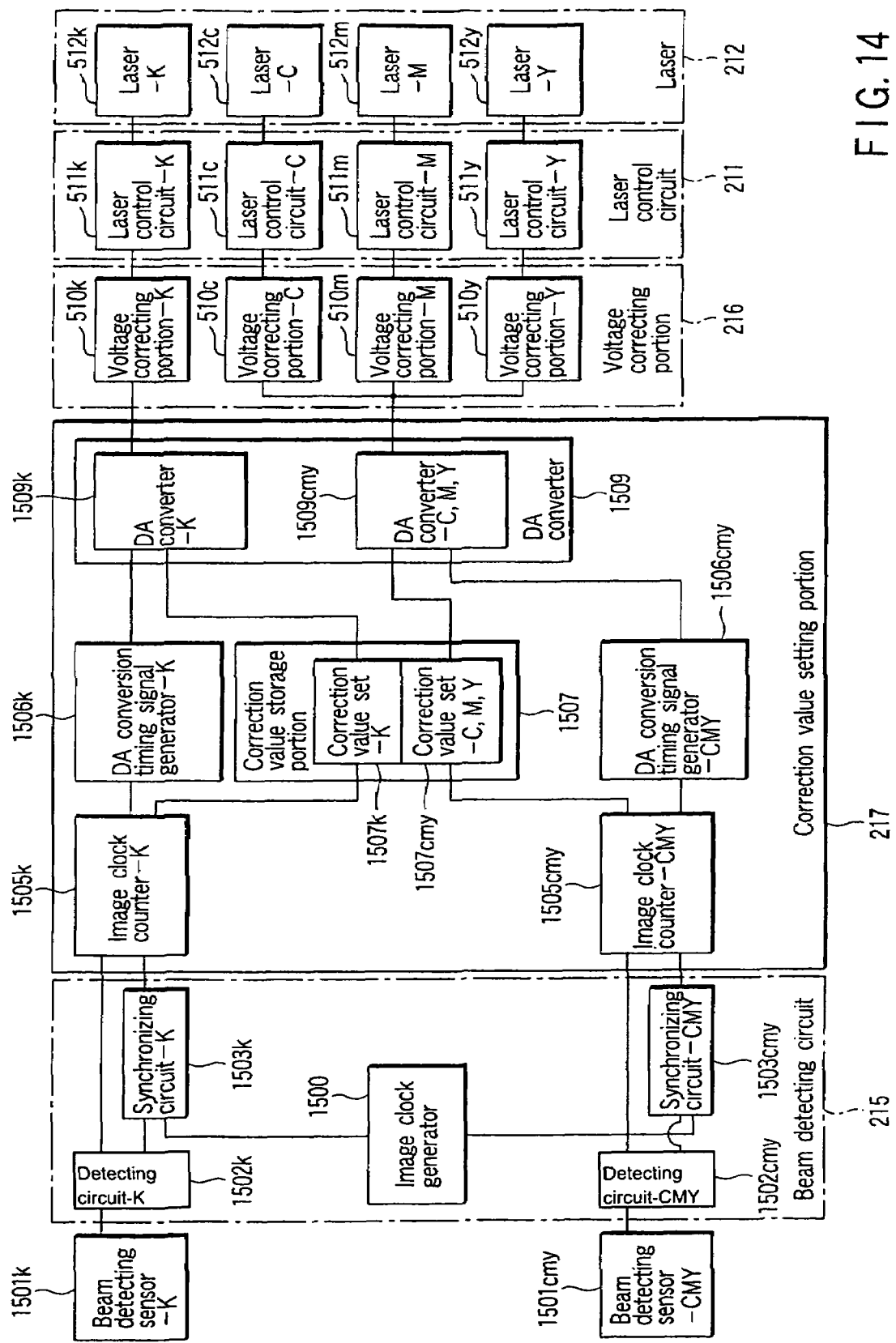
FIG. 14 is a diagram showing a construction of correcting the light amount in the main scanning direction according to the second embodiment.

FIG. 14 shows the construction of correcting the light amount in the main scanning direction according to the second embodiment of the present invention.

In the scanning and exposing portion—K 1200 for black, the swept laser beam is detected by a beam detecting sensor K 1501K, and a horizontal synchronous signal—K serving as a reference for one scan in the main scanning direction is generated by a detecting circuit—K 1502k. Furthermore, an image clock signal serving as a reference for the image data signal is generated by an image clock generator 1500. The image clock signal is synchronized with the horizontal synchronous signal—K by a synchronizing circuit K—1503k, and the image clock signal—K synchronized with the horizontal synchronous signal—K is input into an image clock counter—K 1505k of the correction value setting portion 217.

In the scanning and exposing portion—CMY 1300 for C, M and Y, the swept laser beam is likewise detected by a beam detecting sensor CMY 1501cmy, and a horizontal synchronous signal—CMY serving as a reference for one scan in the main scanning direction is generated by a detecting circuit—CMY 1502cmy. Furthermore, an image clock signal serving as a reference for the image data signal is generated by the image clock generator 1500. A synchronizing circuit—CMY 1503cmy synchronizes the image clock signal with the horizontal synchronous signal—CMY, and inputs the image clock signal—CMY synchronized with the horizontal synchronous signal—CMY to the image clock counter CMY 1505cmy of the correction value setting portion 217.

The correction value setting portion 217 comprises an image clock counter K 1505k, an image clock counter—CMY 1505cmy, a DA conversion timing signal generator—K 1506k, a DA conversion timing signal generator—CMY 1506cmy, a correction value storage portion 1507 and a DA converter 1509.

The correction value storage portion 1507 stores therein the correction value set —K 1507k as correction values over one scan for black to correct the light amount in the main scanning direction, and a correction value set—CMY 1507cmy as correction values over one scan for cyan, magenta and yellow. Furthermore, the DA convener 1509 has therein a DA converter—K 1509k for carrying out DA conversion of black, and a DA converter—CMY 1509cmy for carrying out DA conversion of cyan, magenta and yellow.

The processing after the DA conversion is the same as FIG. 4, and thus the description thereof is omitted.

In the second embodiment, the scanning and exposing portion—K 1200 for black and the scanning and exposing portion—CMY 1300 for C, M, Y are separated from each other. For example, in the scanning and exposing portion—K 1200 for black, by subjecting the optical elements to special coating or using an expensive optical element in order to enhance the precision of only block, the dispersion of the laser light amount in the main scanning direction are different from the laser light amount dispersion in the main scanning direction of the three light sources of the scanning and exposing portion—CMY 1300 for C, M, Y in some cases. However, the optical elements during scanning and exposure of the three laser light sources of the scanning and exposing portion—CMY 1300 for C, M, Y are common to one another because they belong to the same scanning and exposing portion, and thus the tendencies in laser light amount dispersion in the main scanning direction are similar to one another, so that the preset correction value can be made common among them.

As described above, according to the embodiment of the present invention, when the light amount correction in the main scanning direction is carried out on plural light sources, the preset set of the correction values corresponding to the position in the main scanning direction (the correction values for correcting the light amount in the main scanning direction for one scan) are made common every reflection frequency of the optical elements in the scanning and exposing portion, whereby the capacity of the memory can be reduced and the cost can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning and exposing device which exposes photosensitive drums to plural laser beams by scanning each photosensitive drum with a respective laser beam, comprising:
   plural laser light sources for emitting laser beams;
   a main scanning direction synchronizing unit configured to output a synchronous signal of each scan in the main scanning direction;
   a polarizing unit configured to polarize and sweep the laser beams emitting from the plural laser light sources;
   plural optical elements configured to reflect the laser beams polarized and swept by the polarizing unit and guide the laser beams onto respective photosensitive drums;
   a light amount correcting unit configured to correct the light amounts of the laser beams emitted from the plural laser light sources in accordance with the synchronous signal from the main scanning direction synchronizing unit;
   a light amount correction value storage unit configured to make same the correction value sets for correcting the light amounts of the laser beams to be corrected by the light amount correcting unit, and store correction value sets whose number is smaller than the number of the laser light sources,
   wherein the light amount correction value storage unit makes same at least two correction value sets of the light amounts of laser beams emitted from the plural laser light sources.

2. The scanning and exposing device according to claim 1, wherein the light amount correction value storage unit makes same the correction value sets in accordance with colors to be used when the photosensitive drums are exposed to laser beams emitted from the plural laser light sources and developed.

3. A scanning and exposing device which exposes photosensitive drums to plural laser beams by scanning each photosensitive drum with a respective laser beam, comprising:
   plural laser light sources for emitting laser beams;
   a main scanning direction synchronizing unit configured to output a synchronous signal of each scan in the main scanning direction;
   a polarizing unit configured to polarize and sweep the laser beams emitting from the plural laser light sources;
   plural optical elements configured to reflect the laser beams polarized and swept by the polarizing unit and guide the laser beams onto respective photosensitive drums;
   a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes the correction value sets same in accordance with the reflection frequency at the optical elements.

4. A scanning and exposing device which exposes photosensitive drums to plural laser beams by scanning each photosensitive drum with a respective laser beam, comprising:

plural laser light sources for emitting laser beams;

a main scanning direction synchronizing unit configured to output a synchronous signal of each scan in the main scanning direction;

a polarizing unit configured to polarize and sweep the laser beams emitting from the plural laser light sources;

plural optical elements configured to reflect the laser beams polarized and swept by the polarizing unit and guide the laser beams onto respective photosensitive drums;

a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes the correction value sets same in accordance with whether the reflection frequency at the optical elements is equal to an even number of times or an odd number of times.

5. A scanning and exposing device which exposes photosensitive drums to plural laser beams by scanning each photosensitive drum with a respective laser beam, comprising:

plural laser light sources for emitting laser beams;

a main scanning direction synchronizing unit configured to output a synchronous signal of each scan in the main scanning direction;

a polarizing unit configured to polarize and sweep the laser beams emitting from the plural laser light sources;

plural optical elements configured to reflect the laser beams polarized and swept by the polarizing unit and guide the laser beams onto respective photosensitive drums;

a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes the correction value sets of colors excluding black when the photosensitive drums are exposed to laser beams emitted from the plural laser light sources and developed.

6. An image forming device which exposes photosensitive drums to plural laser beams by scanning each photosensitive drum with a respective laser beam, thereby forming an image, comprising:

plural laser light sources for emitting laser beams;

a main scanning direction synchronizing unit configured to output a synchronous signal of each scan in the main scanning direction;

a polarizing unit configured to polarize and sweep the laser beams emitting from the plural laser light sources;

plural optical elements configured to reflect the laser beams polarized and swept by the polarizing unit and guide the laser beams onto respective photosensitive drums;

a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes same at least two correction value sets of the light amounts of laser beams emitted from the plural laser light sources.

7. The image forming device according to claim 6, wherein the light amount correction value storage unit makes same the correction value sets in accordance with colors to be used when the photosensitive drums are exposed to laser beams emitted from the plural laser light sources and developed.

8. An image forming device which exposes photosensitive drums to plural laser beams by scanning each photosensitive drum with a respective laser beam, thereby forming an image, comprising:

plural laser light sources for emitting laser beams;

a main scanning direction synchronizing unit configured to output a synchronous signal of each scan in the main scanning direction;

a polarizing unit configured to polarize and sweep the laser beams emitting from the plural laser light sources;

plural optical elements configured to reflect the laser beams polarized and swept by the polarizing unit and guide the laser beams onto respective photosensitive drums;

a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes the correction value sets same in accordance with the reflection frequency at the optical elements.

9. An image forming device which exposes photosensitive drums to plural laser beams by scanning each photosensitive drum with a respective laser beam, thereby forming an image, comprising:

plural laser light sources for emitting laser beams;

a main scanning direction synchronizing unit configured to output a synchronous signal of each scan in the main scanning direction;

a polarizing unit configured to polarize and sweep the laser beams emitting from the plural laser light sources;

plural optical elements configured to reflect the laser beams polarized and swept by the polarizing unit and guide the laser beams onto respective photosensitive drums;

a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes the correction value sets same in accordance with whether the reflection frequency at the optical elements is equal to an even number of times or an odd number of times.

10. An image forming device which exposes photosensitive drums to plural laser beams by scanning each photosensitive drum with a respective laser beam, thereby forming an image, comprising:

plural laser light sources for emitting laser beams;

a main scanning direction synchronizing unit configured to output a synchronous signal of each scan in the main scanning direction;

a polarizing unit configured to polarize and sweep the laser beams emitting from the plural laser light sources;

plural optical elements configured to reflect the laser beams polarized and swept by the polarizing unit and guide the laser beams onto respective photosensitive drums;

a light amount correcting unit configured to correct the light amounts of the laser beams emitted from the plural laser light sources in accordance with the synchronous signal from the main scanning direction synchronizing unit;

a light amount correction value storage unit configured to make same the correction value sets for correcting the light amounts of the laser beams to be corrected by the light amount correcting unit, and store correction value sets whose number is smaller than the number of the laser light sources, wherein the light amount correction value storage unit makes the correction value sets of colors excluding black when the photosensitive drums are exposed to laser beams emitted from the plural laser light sources and developed.

* * * * *